(12) United States Patent
Calvert

(10) Patent No.: US 9,062,948 B1
(45) Date of Patent: Jun. 23, 2015

(54) AERIAL SMOKE GENERATOR SYSTEM

(71) Applicant: ASGS Associates, Trustee for Aerial Smoke Generator System CRT Trust, Manassas, VA (US)

(72) Inventor: S. Mill Calvert, Manassas, VA (US)

(73) Assignee: ASGS Associates, Trustee for Aerial Smoke Generator System CRT Trust, Manassas, VA (US)

( * ) Notice: Subject to any disclaimer, the term of this patent is extended or adjusted under 35 U.S.C. 154(b) by 0 days.

(21) Appl. No.: 14/505,990

(22) Filed: Oct. 3, 2014

(51) Int. Cl.
*F42B 12/48* (2006.01)

(52) U.S. Cl.
CPC .............. *F42B 12/48* (2013.01); *Y10S 244/904* (2013.01)

(58) Field of Classification Search
CPC ............................. F42B 12/48; Y10S 244/904
USPC ........ 102/361, 334; 89/1.2; 422/305; 424/40; 114/15; 318/16; 244/13; 434/14, 3.14
See application file for complete search history.

(56) References Cited

U.S. PATENT DOCUMENTS

| | | | | |
|---|---|---|---|---|
| 3,884,734 A | | 5/1975 | Palmer et al. | |
| 3,992,628 A | * | 11/1976 | Karney | 250/338.1 |
| 4,007,691 A | | 2/1977 | Haake | |
| 4,443,014 A | * | 4/1984 | Kovit et al. | 273/363 |
| 5,002,490 A | * | 3/1991 | Blackstone | 434/14 |
| 5,929,369 A | * | 7/1999 | Bissig et al. | 102/334 |
| 5,932,978 A | * | 8/1999 | Geyer | 318/16 |
| 6,655,292 B1 | | 12/2003 | Salzeder | |
| 8,888,035 B2 | * | 11/2014 | Lind et al. | 244/13 |
| 2002/0171039 A1 | * | 11/2002 | Bennett | 250/330 |
| 2012/0271491 A1 | * | 10/2012 | Spata | 701/3 |
| 2014/0233099 A1 | | 8/2014 | Stark et al. | |

* cited by examiner

*Primary Examiner* — Samir Abdosh
*Assistant Examiner* — John D Cooper
(74) *Attorney, Agent, or Firm* — Louis Ventre, Jr.

(57) ABSTRACT

An aerial smoke generator system includes a pilotless aircraft, an altimeter, a smoke dispensing container, a rotating impulse-smoke-dispenser, and a processor. The altimeter is mounted to the pilotless aircraft. The smoke dispensing container is connected to the pilotless aircraft and has a smoke-producing chemical under pressure and a nozzle valved to release smoke from the smoke dispensing container. The rotating impulse-smoke-dispenser connected to the nozzle so as to release smoke produced by the smoke dispensing container. The rotating impulse-smoke-dispenser has tubular arms extending radially outward and configured to eject smoke under pressure in a direction promoting rotation of the rotating impulse-smoke-dispenser. The processor is connected to the altimeter and the smoke dispensing container so as to initiate a release of smoke when the pilotless aircraft arrives at a designated height.

3 Claims, 2 Drawing Sheets

AERIAL SMOKE GENERATOR SYSTEM

TECHNICAL FIELD

In the field of ammunition and explosives, an apparatus forms an overhead smoke-screen to hide ground forces from targeting by aircraft.

BACKGROUND ART

Artificial clouds or smoke-screens are forms of camouflage that serve to disrupt the line of sight between a sensor and a target for military purposes. A smoke screen can be an effective shield against ultraviolet, visible and infrared sensors.

The use of aircraft to create a smoke screen has heretofore been employed by dropping multiple smoke producing bombs slowed in descent by parachutes. This use has been limited because it requires air and ground coordination. Such deployment around ground combat troops was limited because it suffers from the vagaries involving air-space management and timely availability.

On the other hand, one of the most important concepts in the technology of warfare is close air ground support, whereby various types of aircraft gun ships can visually see the enemy on the ground and target them with massive firepower to pulverize them. The effectiveness of close air ground support was clearly demonstrated after the 9-11 attack on America when the US military sent about 100 Special Forces soldiers into Afghanistan. The Taliban had a battle-hardened array of about 40,000 soldiers. These 100 Special Forces operators were able to defeat a 40,000 man army because they had the technology of close air ground support.

Drones, like the PREDATORS and GLOBAL HAWKS, are two of the many types of unmanned aircraft that have been used by the U.S. military in Afghanistan and elsewhere. There is no onboard pilot or crew, but they are usually piloted by extremely skilled ground-based aviators. Ground-based aviators are possible thanks to a combination of technological advances. Pilots no longer need to be physically sitting in the airplane. However, that does not make the ground-based pilots any less skilled than traditional in-the-cockpit pilots. Now, fully automated drones can carry out pre-programmed tasks and a ground pilot can take action if determined to be necessary.

The technology for producing a smoke screen includes the use of smoke pots that are typically ground based and pre-deployed on the anticipated battlefield by trucks. Smoke pots are containers of smoke-producing chemicals that, once in place, can be remotely activated, as needed.

Technical Problem

An enemy with close air ground support can locate friendly soldier positions and send aircraft gun ships to fly over these areas, get a visual fix on the friendly soldiers, and then wipe them out with tens of thousands of rounds. Such close air ground support has totally changed the art and strategy of warfare, because the various helicopters and aircraft gun ships can see soldier positions on the ground.

Coordination of defensive air forces deploying a smoke screen to protect ground troops or pre-planning and pre-deploying smoke pots can mean that smoke screen technology is not available to friendly forces when it is needed.

Solution to Problem

The aerial smoke generator system is a small, portable device that a soldier can easily carry clipped onto his belt or on his backpack. It is preferably battery powered, but may alternatively use a small gasoline engine. When a platoon of soldiers on the ground has been spotted by an approaching enemy aircraft gun ship, a soldier can take an aerial smoke generator system and unfold the helicopter drone blades and parts to make it ready for flight.

The soldier then slides a switch to select the desired altitude, pushes a button to start the copter lift blade spanning; and he then releases the aerial smoke generator to fly upward into the sky. When the altimeter connected to the aerial smoke generator processor or control unit tells the control unit it has reached the selected elevation, the unit turns on the rotating impulse-smoke-dispenser, which is a circular smoke expulsion unit that puts out smoke in a circular pattern, as the aerial smoke generator hovers and continually flies in an ever expansive, spiraling-outward pattern.

The technology of warfare is now about to change because the aerial smoke generator system enables ad hoc deployment of an aerial smoke screen that eliminates the ability of enemy close air ground support to see and target friendly forces. The military that possesses this new technology will now be able to protect their soldiers from aerial gunships and still use close air ground support to mow down the enemy that does not have access to this technology.

This new innovative military technology that defeats the enemy's aircraft by obscuring the pilot's line of visual sight to ground forces is called the aerial smoke generator system.

SUMMARY OF INVENTION

An aerial smoke generator system includes a pilotless aircraft, an altimeter, a smoke dispensing container, a rotating impulse-smoke-dispenser, and a processor.

The altimeter is mounted to the pilotless aircraft.

The smoke dispensing container is connected to the pilotless aircraft and has a smoke-producing chemical under pressure and a nozzle valved to release smoke from the smoke dispensing container.

The rotating impulse-smoke-dispenser connected to the nozzle so as to release smoke produced by the smoke dispensing container. The rotating impulse-smoke-dispenser has tubular arms extending radially outward and configured to eject smoke under pressure in a direction promoting rotation of the rotating impulse-smoke-dispenser.

The processor is connected to the altimeter and the smoke dispensing container so as to initiate a release of smoke when the pilotless aircraft arrives at a designated height.

Optionally, a selector switch connected to the processor enabling field setting a height for release of smoke.

Optionally, automated flight controls enable the processor to send the pilotless aircraft in a spiraling outward trajectory when the pilotless aircraft reaches the designated height.

In an alternative embodiment, a pilotless helicopter has a propeller system that creates asymmetrical torque used to rotate the smoke dispensing container.

Advantageous Effects of Invention

The aerial smoke generator system creates a circular flat pancake-shaped smoke blanket in the sky that will obscure visual sight lines from the gunners in the gunships so they can no longer see the ground forces to target them. This circular flat pancake-shaped smoke blanket is significantly different from existing smoke generating systems in that it maximizes the area obscured by the available smoke.

A number of soldiers that are spread out on the ground can release various aerial smoke generators to cover a wide expanse of the sky with the vision-blocking smoke blanket. The soldiers on the ground that now have a protective smoke shield, can regroup, change direction, change formation, call for their own aircraft to come and attack the enemy aircraft, etc. They can also use diversion tactics with aerial smoke generators by sending a small group of soldiers in a different direction to set off various aerial smoke generators along the way so the aircraft above will think all of the soldiers are moving in the direction of the new smoke blankets.

The aerial smoke generator system is a new, valuable military tool to protect the soldiers of the military that possesses this technology. No longer will their soldiers have to risk being pulverized and cut into pieces by close air ground support. Now military planners once again have the option to move masses of troops across an open area to reach a military objective and accomplish their mission while protecting their ground troops. The aerial smoke generator system is also excellent for making large convoys of military vehicles and tanks disappear from line of sight. The military that possesses and controls aerial smoke generator technology will have a great advantage over its enemy.

The aerial smoke generator system may have other applications where a thin layer of fog-like material must be distributed over a large area, for example for distributing insecticide over a crop area.

BRIEF DESCRIPTION OF DRAWINGS

The drawings illustrate preferred embodiments of the aerial smoke generator system according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made without departing from the scope of the present invention.

Figure 1:
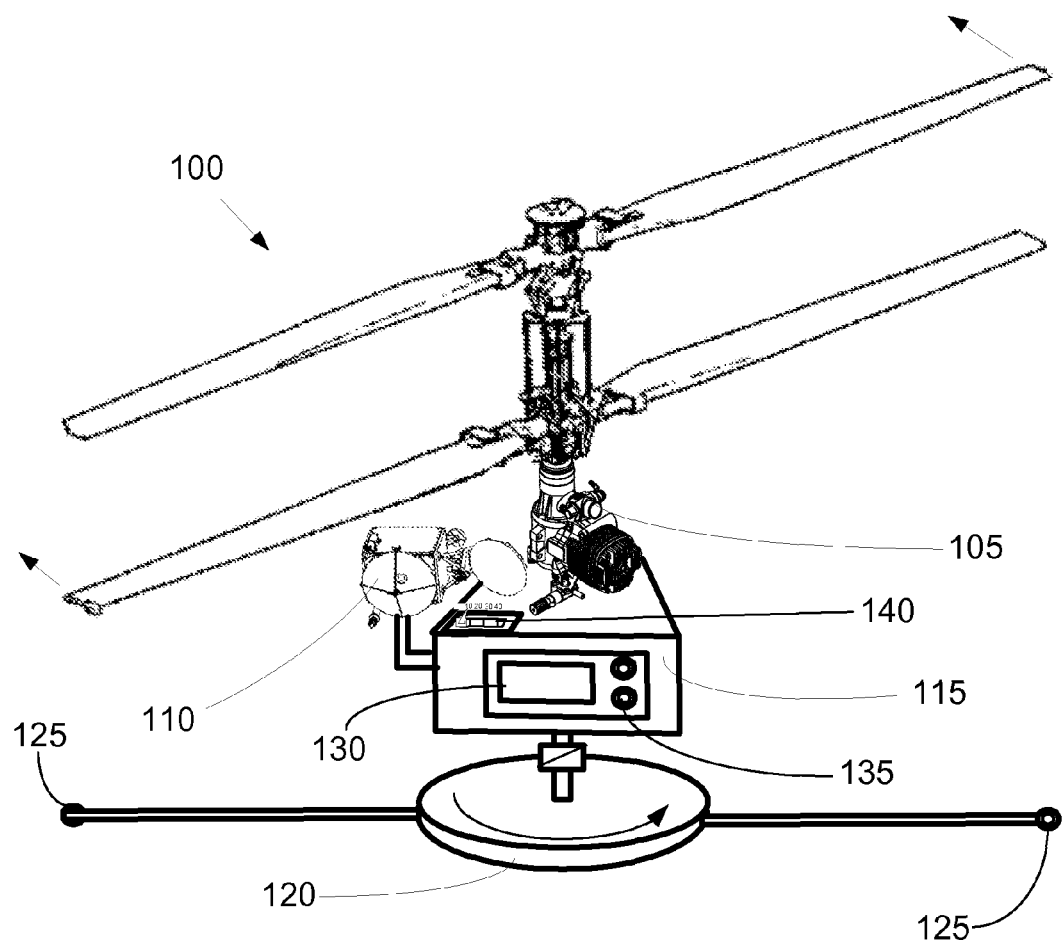
FIG. 1 is a perspective of a first preferred embodiment of the aerial smoke generator system.

FIG. 1 shows an aerial smoke generator system (100) according to a preferred embodiment, as discussed herein. This preferred embodiment of the aerial smoke generator system (100) includes the components: a pilotless aircraft (105); an altimeter (110); a smoke dispensing container (115); a rotating impulse-smoke-dispenser (120); and a processor (130). The term "smoke" is intended to be interpreted broadly to include a collection of airborne solid and liquid particulates and gases together with a quantity of air that is entrained or otherwise mixed therewith.

The pilotless aircraft (105) is alternatively known as a drone. It is an unmanned aerial vehicle that can fly autonomously, without an on-board pilot, for example under the autonomous control of the processor (130) onboard the craft. It may have a remote, on the ground pilot who can take control when required for specific reasons and in these instances it is sometimes commonly referred to under various names, such as a remotely piloted aircraft (RPA); remotely piloted vehicle (RPV), and remotely operated aircraft (ROA). When combined with the other components of the aerial smoke generator system (100), the pilotless aircraft (105) may be thought of as an unmanned aircraft system.

For purposes of the operation of the aerial smoke generator system (100), the pilotless aircraft (105) is able to perform its aerial smoke-screen producing operations independently of human control. This does not mean that a human may not control the operations, only that the pilotless aircraft (105) can conduct its operations automatically, as programmed, without the need for human control. Preferably, there is ground data terminal operated by the soldier in the field and the corresponding radio controls in the pilotless aircraft (105). A preferred ground data terminal is a cell phone operating an application program for the pilotless aircraft (105).

The pilotless aircraft (105) can be in any form commonly found, for example a fixed wing airplane, like the PREDATOR drone used by the U.S. Air Force, or a single- or multiple-propeller helicopter, often called rotorcraft designs. A required criterion for the pilotless aircraft (105) is that the pilotless aircraft (105) must be able to take off with the other components of the aerial smoke generator system (100) and thereafter perform its aerial functions in creating an overhead cloud-like smoke screen.

The pilotless aircraft (105) may be powered by a battery or an internal combustion engine. An example of a battery-powered drone is an AR.DRONE having four separated propellers and termed a "quadricopter." The AR.DRONE is powered by two 1,500 mAh lithium-polymers batteries having a battery life for a half hour or more of flight time.

For longer operating time, the pilotless aircraft (105) may be powered using an internal combustion engine. These are well known in the art. Many drones are powered by one of the ROTAX internal combustion engines, which are available in a four-stroke and a two-stroke engine. Use of an internal combustion engine can deliver a flight capability to loiter overhead for 14 hours or more.

The altimeter (110) in the aerial smoke generator system (100) is mounted to the pilotless aircraft (105). The altimeter (110) may be any device that determines height above ground.

Figure 2:
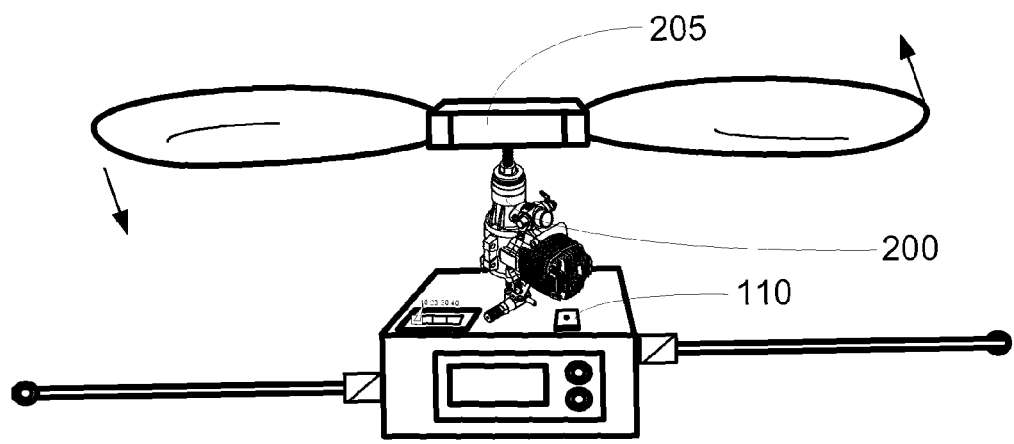
FIG. 2 is a perspective view of a second preferred embodiment of the aerial smoke generator system.
Figure 4:
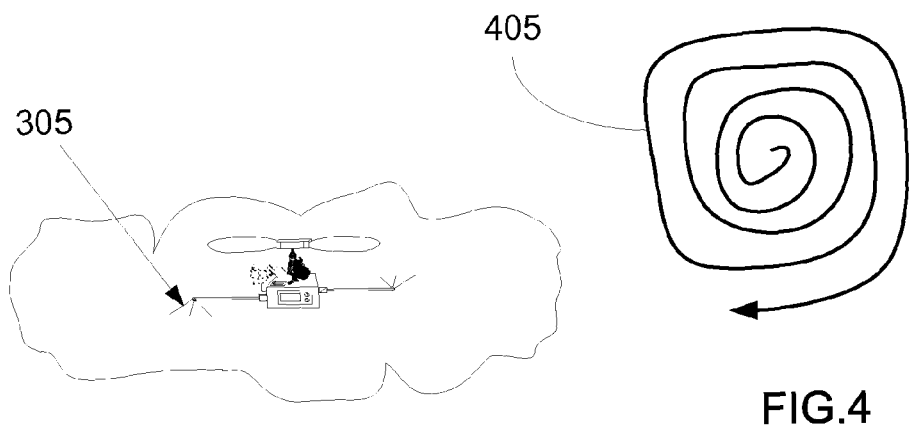
FIG. 4 is a top view of an outward spiral pattern transited by the aerial smoke generator system when in use.
Figure 3:
FIG. 3 is an illustration of the aerial smoke generator system in use over soldiers.

There are several types of height determining devices. Common examples include: one that is a digital barometric pressure sensor of a size that fits on a person's wrist; one that uses a sensitive aneroid barometer; another that uses the Global Positioning System; one that uses ultrasound sensors; and another that uses radio waves to determine height above sea level or the ground. These are exemplary and the radar altimeter shown in FIG. 1 and the digital barometric pressure sensor shown in FIG. 2 are simply for illustration purposes. The altimeter (110) is preferably one that is packaged in the lightest weight and size, such as the digital barometric pressure sensor shown in FIG. 2.

The smoke dispensing container (115) in the aerial smoke generator system (100) is connected to the pilotless aircraft (105) so that it not only moves with the pilotless aircraft (105), but it is interconnected with the processor (130), altimeter and operational controls. The smoke dispensing container (115) includes a smoke-producing chemical (305) under pressure and a nozzle (125) valved to release smoke from the smoke dispensing container (115).

The smoke that is dispensed is typical smoke that is a collection of airborne solid and liquid particulates and gases emitted when a material undergoes combustion or pyrolysis, together with the quantity of air that is entrained or otherwise mixed into the mass. The typical smoke particles are an aerosol of solid particles and liquid droplets near an ideal range of sizes for Mie scattering of visible light. Preferably, the smoke dispensed is a cloud that thoroughly scrambles light so as to make objects on either side unseeable.

Liquid smoke producers are known in the art and include, for example a 12 v DC portable smoke machine in the size of a small water bottle operates with a liquid that can produce smoke for about an hour.

The smoke-producing chemical (305) is preferably a pyrotechnical smoke generator. An example is a smoke machine weighing about 3 kilograms (about 6.6 lbs) that uses smoke oil stored in disposable smoke canisters. The smoke oil is forced under pressure from an inert propellant into a heat exchanger, where it is vaporized using heat applied by a high efficiency burner. The burner draws gas from a standard propane/butane cartridge. The vapor produced condenses on reaching normal atmosphere and a dense, non-toxic white smoke is produced. This smoke machine enables field replacement of the canisters and cartridge to re-establish the operability of the smoke dispensing container (115).

Alternatively, the smoke-producing chemical (305) is a combination of smoke acid ($HCLSO_3+SO_3$), titanium tetrachloride, and stannic chloride, which when combined produce a dense cloud of smoke. In one such smoke producing apparatus, a metallic disc and a nylon washer containing an explosive primer are disposed between a bottle and the closed end of an aluminum tube. Upon igniting the primer, the copper disc forces the bottom of the bottle to collapse, placing a force on the smoke-producing chemical. This force shears the neck of the bottle and the titanium tetrachloride is expelled from the aluminum tube and the bottle, creating a cloud of smoke.

When the smoke is expelled from the aerial smoke generator system (100), it is done so that it forms a relatively thin and flat sheet in order to maximize the area covered by the smoke. This is accomplished with the rotating impulse-smoke-dispenser (120).

The rotating impulse-smoke-dispenser (120) is connected to the nozzle (125) so as to release smoke produced by the smoke dispensing container (115) in a relatively thin planar cloud. Rotation is preferably imparted by engaging a geared connection to the power system for the pilotless aircraft (105), but may alternatively be accomplished by a separate battery.

The preferred rotating impulse-smoke-dispenser (120) includes tubular arms extending radially outward and configured to eject smoke under pressure in a direction promoting rotation of the rotating impulse-smoke-dispenser (120). Such ejection of smoke forms a relatively planar cloud that maximizes the use of the available smoke to obscure what is below. The flight pattern of the pilotless aircraft (105) is automated and controlled by the processor (130). Preferably, automated flight controls (135) enable the processor (130) to send the pilotless aircraft (105) in a spiraling outward trajectory (405) when the pilotless aircraft (105) reaches the designated height.

The processor (130) in the aerial smoke generator system (100) is connected to the altimeter (110) and the smoke dispensing container (115) so as to initiate a release of smoke when the pilotless aircraft (105) arrives at a designated height. The faster the processor, the better with respect to responsiveness of the components to the control mechanism. An example of an acceptable processor is 1 GHz 32 bit ARM Cortex A8 processor with 800 MHz video DSP TMS320DMC64x using an operating system such as Linux and connected to a 1 Gbit DDR2 RAM at 200 MHz, having a USB 2.0 high speed port, and a Wi-Fi capability.

Optional components interconnected with the processor (130) include a 3 axis gyroscope having 2,000 degree/second precision, 3-axis accelerometer with plus or minus 50 mg precision, a 3 axis magnetometer with 6 degree precision, and a pressure sensor with plus or minus 10 Pa precision. A camera may also be provided for ground speed measurement, such as 60 fps vertical QVGA camera. While optional, the aerial smoke generator system (100) preferably includes a selector switch (140) connected to the processor (130) enabling manual setting a pre-set height for release of smoke. The release height can be pre-programmed in the processor, and the selector switch (140) enables battlefield personnel to make a simple manual override adjustment to suit the conditions found in the field.

FIG. 2 illustrates a first alternative embodiment of the aerial smoke generator system (100), which includes a pilotless helicopter (200); an altimeter (110); a smoke dispensing container (115); and a processor (130).

In this first alternative embodiment, rotation of the smoke dispensing container (115) is caused by a propeller system (205) that creates asymmetrical torque, such as when only one rotor is used without a tail rotor to compensate. When the aircraft is a helicopter with a single rotor, the body of the helicopter will tend to spin in an opposite direction to the main rotor once aircraft lifts off the ground. The usual countervailing force to prevent such rotation in a helicopter is a tail rotor. Asymmetrical torque can also be experienced when using multiple rotors spinning in opposite directions, but do not fully offset each other. However, in any event, if the compensating rotor does not fully counter rotate the aircraft, it creates an asymmetrical torque that can be used to spin the aircraft and in the case of this first alternative embodiment, provide at least one force that rotates the smoke dispensing container (115).

In this first alternative embodiment, the altimeter (110) is the same as described above for the preferred embodiment. Accordingly, the altimeter (110) is mounted to the pilotless helicopter (200), which is more specific than the pilotless aircraft (105) in the preferred embodiment.

In this first alternative embodiment, the smoke dispensing container (115) is connected to the pilotless helicopter (200) below the propeller system (205). As with the preferred embodiment, the smoke dispensing container (115) includes a smoke-producing chemical (305) under pressure and a nozzle (125) valved to release smoke from the smoke dispensing container (115).

This first alternative embodiment includes the processor (130) with similar features and operability as discussed for the preferred embodiment. Thus, the processor (130) is connected to the altimeter (110) and the nozzle (125), the processor (130) programmed to initiate production of smoke from the smoke dispensing container (115), open the nozzle (125) and release smoke when the pilotless helicopter (200) arrives at a designated height. As with the preferred embodiment, automated flight controls (135) enable the processor (130) to send the pilotless helicopter (200) in a spiraling outward trajectory (405) when the pilotless helicopter (200) reaches the designated height. Also, as with the preferred embodiment, the first alternative embodiment may include a selector switch (140) connected to the processor (130) enabling setting a pre-set height for release of smoke.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the ammunition and explosives industry.

What is claimed is:

1. An aerial smoke generator system comprising:
a pilotless aircraft;
an altimeter mounted to the pilotless aircraft;
a smoke dispensing container connected to the pilotless aircraft, the smoke dispensing container comprising a smoke-producing chemical under pressure and a nozzle valved to release smoke from the smoke dispensing container;
a rotating impulse-smoke-dispenser connected to the nozzle so as to release smoke produced by the smoke dispensing container, the rotating impulse-smoke-dispenser comprising tubular arms extending radially outward and configured to eject smoke under pressure in a direction promoting rotation of the rotating impulse-smoke-dispenser; and
a processor connected to the altimeter and the smoke dispensing container so as to initiate a release of smoke when the pilotless aircraft arrives at a designated height.

2. The aerial smoke generator system of claim 1, further comprising a selector switch connected to the processor and configured to enable manual override adjustment of a pre-set height for release of smoke.

3. The aerial smoke generator system of claim 1, further comprising automated flight controls configured to command the processor to send the pilotless aircraft in a spiraling outward trajectory when the pilotless aircraft reaches the designated height.

* * * * *